United States Patent
Hiwatashi et al.

(10) Patent No.: US 12,523,918 B2
(45) Date of Patent: Jan. 13, 2026

(54) OPTICAL ELEMENT DRIVING DEVICE, CAMERA MODULE, CAMERA-MOUNTED DEVICE, AND DRIVING METHOD

(71) Applicants: Koki Hiwatashi, Tokyo (JP); Yoichi Itagaki, Tokyo (JP)

(72) Inventors: Koki Hiwatashi, Tokyo (JP); Yoichi Itagaki, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 310 days.

(21) Appl. No.: 18/376,449

(22) Filed: Oct. 4, 2023

(65) Prior Publication Data

US 2024/0118587 A1    Apr. 11, 2024

(30) Foreign Application Priority Data

Oct. 5, 2022 (JP) .................................. 2022-161094

(51) Int. Cl.
  *G03B 3/10* (2021.01)
  *G03B 17/12* (2021.01)
  *G03B 30/00* (2021.01)
(52) U.S. Cl.
  CPC .............. *G03B 3/10* (2013.01); *G03B 17/12* (2013.01); *G03B 30/00* (2021.01)

(58) Field of Classification Search
  None
  See application file for complete search history.

(56) References Cited

U.S. PATENT DOCUMENTS

2011/0164331 A1* 7/2011 Sugiyama .............. H02N 2/062
                                                          327/299

FOREIGN PATENT DOCUMENTS

JP              5233922           7/2013

* cited by examiner

*Primary Examiner* — Phu Vu

(57) ABSTRACT

An optical element driving device includes a fixed body, a movable body, a driving part that converts vibration motion of a piezoelectric element into linear motion for driving the movable body, a drive control part that applies a drive signal to the driving part, a drive detection part that detects the drive state of the driving part, and a temperature measurement part that measures an ambient temperature. The drive control part determines whether or not a drive error of the driving part occurs from the information detected by the drive detection part. When the drive error occurs, drive control part compares an ambient temperature associated with the current drive frequency with the current ambient temperature measured by the temperature measurement part, corrects the drive frequency according to the comparison result, and stores the corrected drive frequency and the current ambient temperature in association with each other.

10 Claims, 7 Drawing Sheets

| DRIVE FREQUENCY | CORRECTION FREQUENCY f0 − 2fc | CORRECTION FREQUENCY f0 − fc | REFERENCE FREQUENCY f0 | CORRECTION FREQUENCY f0 + fc | CORRECTION FREQUENCY f0 + 2fc |
|---|---|---|---|---|---|
| SET TEMPERATURE | — | — | REFERENCE TEMPERATURE T0 | — | — |

FIG. 6A

| DRIVE FREQUENCY | CORRECTION FREQUENCY f0 − 2fc | CORRECTION FREQUENCY f0 − fc | REFERENCE FREQUENCY f0 | CORRECTION FREQUENCY f0 + fc | CORRECTION FREQUENCY f0 + 2fc |
|---|---|---|---|---|---|
| SET TEMPERATURE | — | — | REFERENCE TEMPERATURE T0 | CORRECTION TEMPERATURE T1 | — |

FIG. 6B

| DRIVE FREQUENCY | CORRECTION FREQUENCY f0 − 2fc | CORRECTION FREQUENCY f0 − fc | REFERENCE FREQUENCY f0 | CORRECTION FREQUENCY f0 + fc | CORRECTION FREQUENCY f0 + 2fc |
|---|---|---|---|---|---|
| SET TEMPERATURE | — | CORRECTION TEMPERATURE T3 | REFERENCE TEMPERATURE T0 | — | — |

FIG. 6C

| DRIVE FREQUENCY | CORRECTION FREQUENCY f0 − 2fc | CORRECTION FREQUENCY f0 − fc | REFERENCE FREQUENCY f0 | CORRECTION FREQUENCY f0 + fc | CORRECTION FREQUENCY f0 + 2fc |
|---|---|---|---|---|---|
| SET TEMPERATURE | — | — | REFERENCE TEMPERATURE T0 | CORRECTION TEMPERATURE T1 | CORRECTION TEMPERATURE T2 |

FIG. 6D

| DRIVE FREQUENCY | CORRECTION FREQUENCY f0 − 2fc | CORRECTION FREQUENCY f0 − fc | REFERENCE FREQUENCY f0 | CORRECTION FREQUENCY f0 + fc | CORRECTION FREQUENCY f0 + 2fc |
|---|---|---|---|---|---|
| SET TEMPERATURE | — | — | REFERENCE TEMPERATURE T0 | CORRECTION TEMPERATURE T1 (OVERWRITING) | CORRECTION TEMPERATURE T2 |

FIG. 6E

OPTICAL ELEMENT DRIVING DEVICE, CAMERA MODULE, CAMERA-MOUNTED DEVICE, AND DRIVING METHOD

CROSS REFERENCE TO RELATED APPLICATION

This application is entitled to and claims the benefit of priority of Japanese Patent Application No. 2022-161094, filed on Oct. 5, 2022, the contents of which are incorporated by reference as if fully set forth herein in their entirety.

TECHNICAL FIELD

The present invention relates to an optical element driving device, a camera module, a camera-mounted device and driving method.

BACKGROUND ART

Typically, a small camera module is mounted in a camera-mounted device such as a smartphone or a drone. Drones are unmanned aircrafts that can be flown by remote control or automatic control, and some of them are called multicopters.

A camera module includes an optical element driving device for driving an optical element such as a lens. An optical element driving device has, for example, an automatic focusing function (hereinafter, referred to as an "AF function" (AF: auto focus)) configured to move an optical element (for example, lens) in the optical axis direction to automatically perform focusing during imaging a subject. As a driving part capable of performing the AF function, for example, an ultrasonic motor type actuator having a piezoelectric element (piezo element) is known (see, for example, Patent Literature 1 (hereinafter referred to as "PTL1")).

The resonance frequency of a piezoelectric element is known to change depending on temperature. In the driving method described in PTL1, a drive frequency is corrected based on the current ambient temperature, and a drive signal including the corrected drive frequency is applied to a piezoelectric element.

CITATION LIST

Patent Literature

PTL1
Japanese Patent No. 5233922

SUMMARY OF INVENTION

However, there are individual differences in the temperature dependence of the resonance frequencies of piezoelectric elements. Therefore, when a relationship, in which the drive frequency and the ambient temperature are associated in advance, is applied to all actuators as in Japanese Patent No. 5233922, the drive frequency may not always be corrected appropriately, thereby failing desired drive control.

An object of the present invention is to provide an optical element driving device, a camera module, camera-mounted device, and a driving method each capable of appropriately correcting the drive frequency of a drive signal to be applied to a piezoelectric element according to the ambient temperature, thereby performing desired drive control.

Solution to Problem

An optical element driving device according to the present invention includes:

a fixed body;
a movable body that holds an optical element and is disposed so as to be movable with respect to the fixed body;
a driving part that includes a piezoelectric element and converts vibration motion of the piezoelectric element into linear motion for driving the movable body;
a drive control part that applies a drive signal including a predetermined drive frequency to the driving part;
a drive detection part that detects a drive state of the driving part; and
a temperature measurement part that measures an ambient temperature of the driving part.

In the optical element driving device,
the drive control part is configured to store a plurality of drive frequencies and a plurality of ambient temperatures respectively in association with each other,
the drive control part determines whether or not a drive error of the driving part occurs from information detected by the drive detection part,
when the drive error occurs, the drive control part performs comparison between an ambient temperature associated with a current drive frequency and a current ambient temperature measured by the temperature measurement part, the ambient temperature being one of the plurality of ambient temperatures, and
the drive control part corrects the current drive frequency according to a result of the comparison, and stores the current drive frequency corrected and the current ambient temperature in association with each other.

A camera module according to the present invention includes:
the optical element driving device described above; and
an imaging part that captures a subject image by using the optical element.

A camera-mounted device according to the present invention is an information device or a transporting device, and includes:
the camera module described above.

A driving method according to the present invention is a method for driving an optical element driving device that includes a fixed body, a movable body disposed so as to be movable with respect to the fixed body, and a driving part including a piezoelectric element and converting vibration motion of the piezoelectric element into linear motion for driving the movable body.

The method comprising:
applying a drive signal including a predetermined drive frequency to the driving part;
detecting a drive state of the driving part;
measuring a current ambient temperature of the driving part;
determining whether or not a drive error of the driving part occurs from the drive state detected;
when the drive error occurs, performing comparison between an ambient temperature associated with a current drive frequency and the current ambient temperature measured, and
correcting the current drive frequency according to a result of the comparison; and
storing the current drive frequency corrected and the current ambient temperature in association with each other.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein:

FIGS. 6A to 6E each illustrate an example of a frequency table; and

DESCRIPTION OF EMBODIMENTS

Hereinafter, at least one embodiment of the present invention will be described in detail with reference to the accompanying drawings.

Smartphone

Figure 1A:
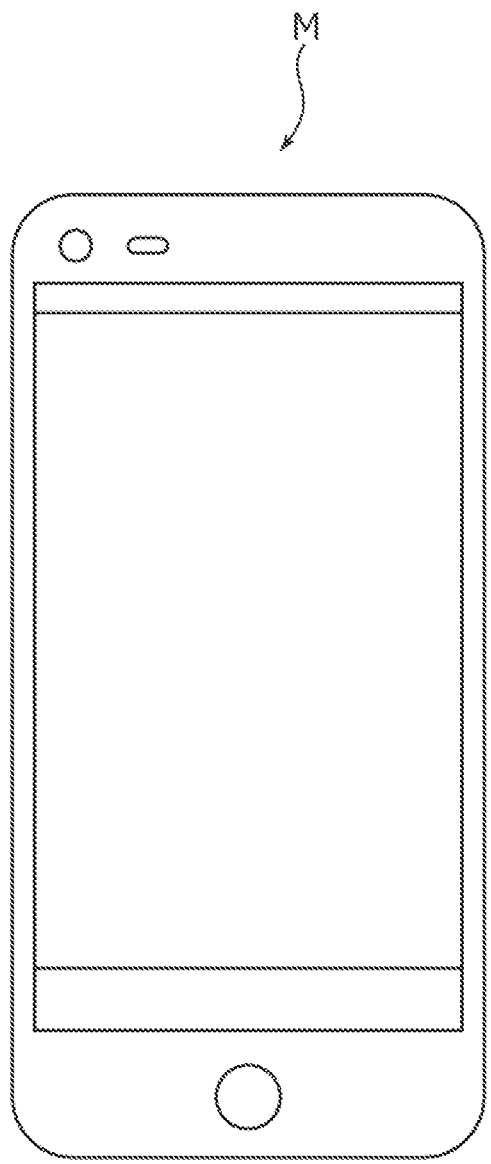
FIGS. 1A and 1B illustrate a smartphone equipped with a camera module according to an embodiment of the present invention.
Figure 1B:
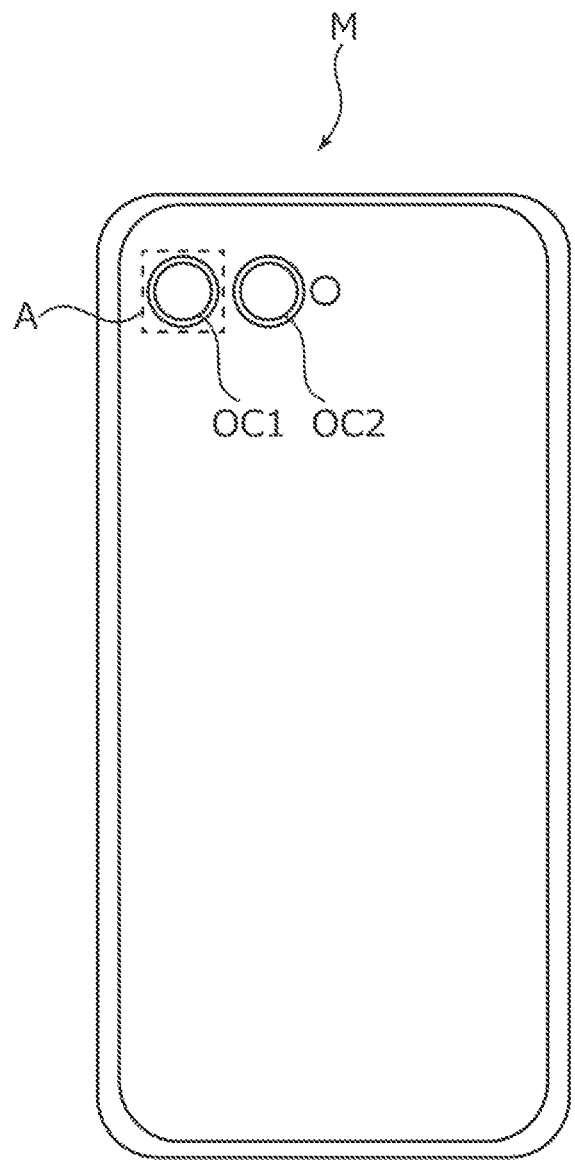

FIGS. 1A and 1B illustrate smartphone M (exemplary camera-mounted device) equipped with camera module A according to an embodiment of the present invention. FIG. 1A is a front view of smartphone M, and FIG. 1B is a rear view of smartphone M.

Smartphone M includes a dual camera consisting of two rear cameras OC1 and OC2. In the present embodiment, camera module A is applied to rear camera OC1 and/or OC2.

Camera Module

Figure 2:
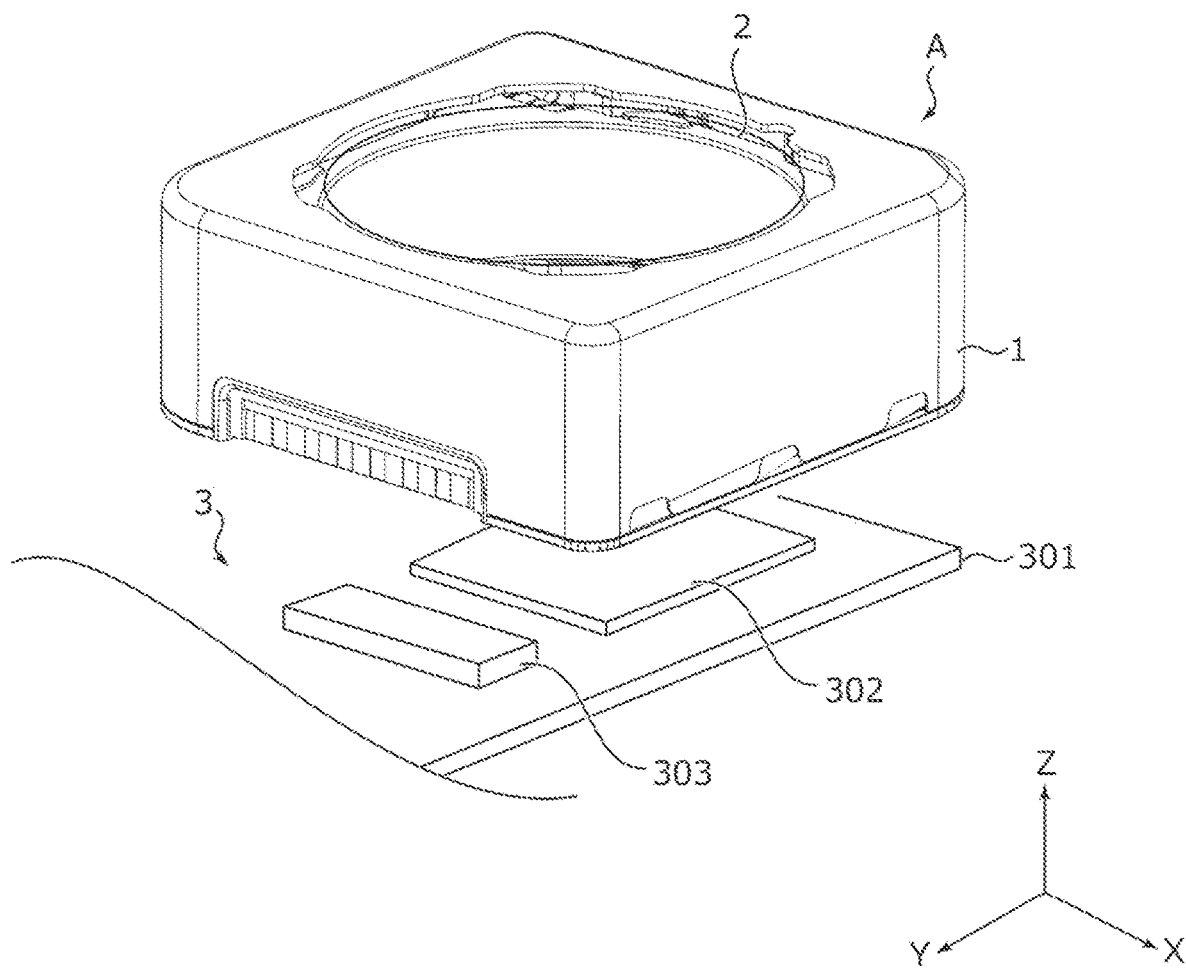
FIG. 2 is an external perspective view of the camera module.

FIG. 2 is an external perspective view of camera module A. An orthogonal coordinate system (X, Y, Z) is used for the description in the present embodiment. The orthogonal coordinate system (X, Y, Z) is used commonly in the drawings described below.

Camera module A is mounted in such a way that, for example, the X-axis direction is a vertical direction (or a horizontal direction), the Y-axis direction is the horizontal direction (or the vertical direction), and the Z-axis direction is a front-rear direction when smartphone M is actually used for the photographing. That is, the Z-axis direction is the optical axis direction, the upper side (+Z side) in the drawing is the light receiving side in the optical axis direction, and the lower side (−Z side) in the drawing is the image forming side in the optical axis direction. In addition, the X-axis direction and the Y-axis direction each orthogonal to the Z-axis are referred to as "optical axis orthogonal directions," and the XY plane is referred to as "optical axis orthogonal plane." The optical axis direction may also be referred to as an optical path direction or a focus direction (a direction in which the focus is adjusted) depending on the type of optical element.

Camera module A has the AF function, and can automatically perform focusing during the photographing of a subject. Camera module A may have a shake correction function (hereinafter referred to as "OIS function" (OIS: optical image stabilization)). In this case, camera module A can optically correct shake (vibration), generated during the photographing, with the use of the OIS function, thereby obtaining an image without image blur.

As illustrated in FIG. 2, camera module A includes optical element driving device 1 capable of performing an AF function, lens part 2 that includes a cylindrical lens barrel housing a lens, and imaging part 3 that captures a subject image formed by lens part 2. In other words, optical element driving device 1 is a device referred to as a lens driving device that drives lens part 2 serving as an optical element.

Optical element driving device 1 of the present embodiment is designed for being mounted on the above-described camera module A or the like, thus has a configuration in which the length in the Z-axis direction is shorter than the lengths in the X-axis direction and the Y-axis direction, that is, the height along the Z-axis direction is reduced.

Imaging part 3 is disposed on the image forming side of optical element driving device 1 in the Z-axis direction. Imaging part 3 includes, for example, image sensor board 301, and imaging element 302 and module control part 303 both mounted on image sensor board 301.

Image sensor board 301 is, for example, a flexible printed circuit board (FPC) and is configured to be able to transmit an imaging signal obtained by imaging element 302 to a control device (not illustrated) of smartphone M. The control device of smartphone M includes an image processing part (not illustrated) for processing the received imaging signal.

Imaging element 302 is composed of, for example, a charge coupled device (CCD) image sensor, a complementary metal oxide semiconductor (CMOS) image sensor, or the like, and captures the subject image formed by lens part 2.

Module control part 303 is composed of, for example, a control IC, and controls driving of optical element driving device 1. Optical element driving device 1 is mounted on image sensor board 301 and mechanically and electrically connected thereto. Module control part 303 may be provided on image sensor board 301, or may be provided in a camera-mounted device (smartphone M in the present embodiment) equipped with camera module A.

Optical Element Driving Device

Figure 3:
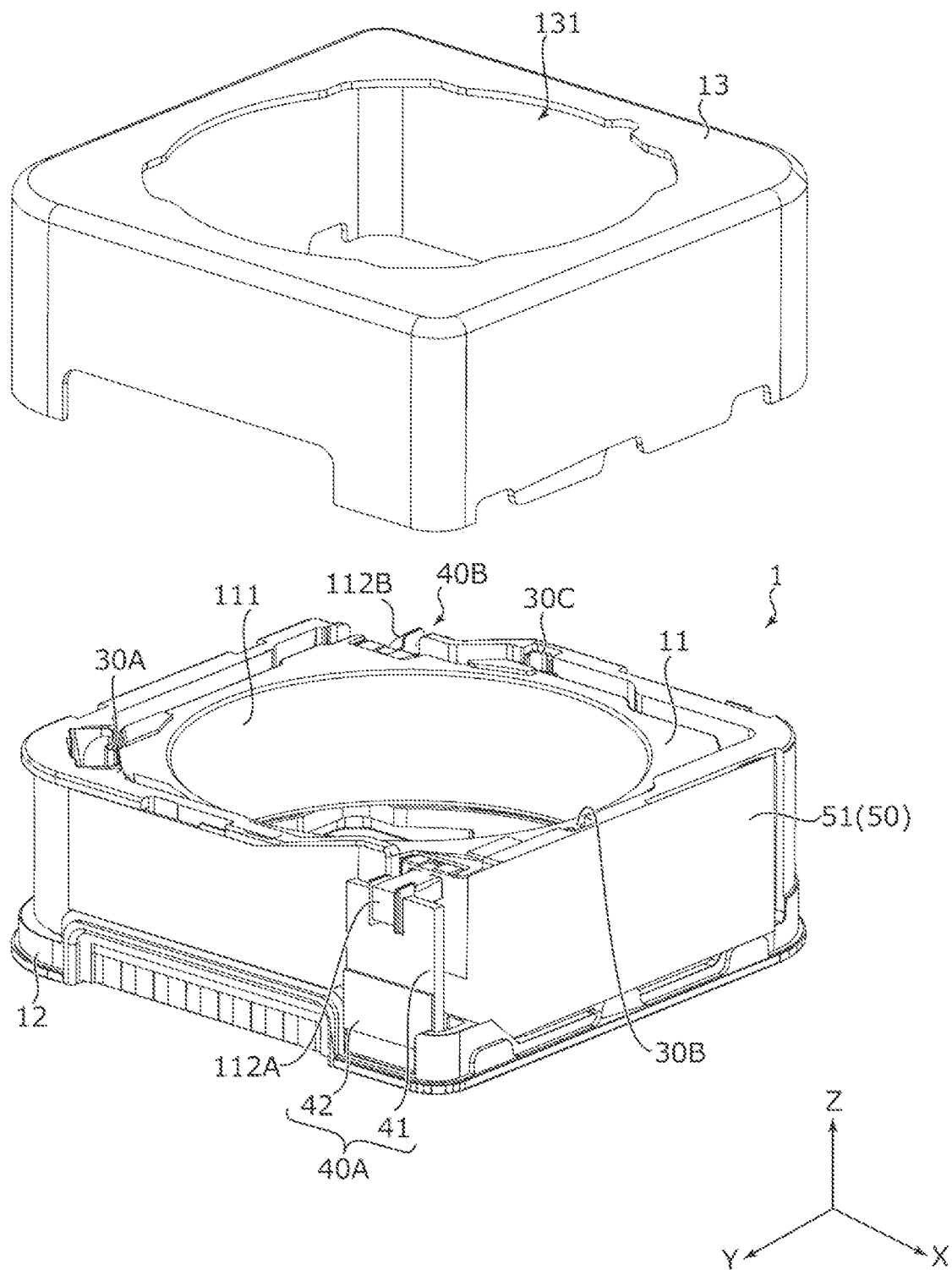
FIG. 3 is an external perspective view of an optical element driving device.

FIG. 3 is an external perspective view of optical element driving device 1. FIG. 3 illustrates the optical element driving device with cover 13 removed.

As illustrated in FIG. 3, optical element driving device 1 includes lens holder 11, base 12, cover 13, support parts 30A to 30C, driving parts 40A and 40B, and circuit board part 50.

Cover 13 is an exterior body of optical element driving device 1 and covers the outside of the main body of the driving device (reference numeral omitted). Cover 13 is a lidded quadrangular tube having a substantially rectangular shape in plan view seen from above in the Z-axis direction. The shape of cover 13 in plan view is, for example, square. In other words, optical element driving device 1 has a rectangular shape expanding in the X-axis direction and the Y-axis direction in plan view seen from above in the Z-axis direction. In the following description, "plan view" means a plan view seen from above in the Z-axis direction.

Cover 13 includes a substantially circular opening 131 on the surface (upper surface) on the light receiving side in the optical axis direction. Lens part 2 (see FIG. 2) faces the outside through opening 131 of cover 13. Lens part 2 may be disposed so as to protrude from the opening surface of cover 13 toward the light receiving side in the Z-axis direction. Cover 13 is fixed to base 12 of optical element driving device 1 by adhesion, for example.

Cover 13 may be made of, for example, a magnetic material, thus may have a shielding function of blocking incoming electromagnetic waves from the outside or blocking radiation of electromagnetic waves to the outside.

Lens holder 11 is a movable body that holds lens part 2 (see FIG. 2) and moves in the Z-axis direction during focusing. Lens holder 11 is disposed apart and radially inward from base 12 and is supported by base 12 via support parts 30A to 30C while being biased.

Lens holder 11 is formed from, for example, polyarylate (PAR), a PAR alloy obtained by mixing a plurality of resin materials including PAR, a liquid crystal polymer, or the like. Lens holder 11 includes cylindrical lens housing part 111. Lens part 2 (see FIG. 2) is fixed to the inner peripheral surface of lens housing part 111 by, for example, adhesion.

Lens holder 11 includes power transmission parts 112A and 112B on the outer peripheral surface of lens housing part 111. The power of driving parts 40A and 40B is transmitted to the power transmission parts. Power transmission parts 112A and 112B are disposed, for example, at point-symmetrical positions with respect to the optical axis. Power transmission parts 112A and 112B may be integrally molded with lens holder 11, or may be molded separately from lens holder 11 with a different material and fixed to lens holder 11.

Lens holder 11 includes, on the outer peripheral surface of lens housing part 111, holder-side ball holding parts (reference numerals omitted) for holding support parts 30A to 30C. The holder-side ball holding parts are disposed, for example, at a rotationally symmetrical positions (for example, 120° rotationally symmetrical) with respect to the optical axis.

Base 12 is a fixed body that supports lens holder 11 via support parts 30A to 30C in such a way that lens holder 11 is movable in the Z-axis direction. Base 12 has, for example, a shape of a quadrangular tube that is substantially rectangular in plan view seen from above in the Z-axis direction.

Base 12 is formed from, for example, a molding material made of polyarylate (PAR), a PAR alloy (for example, PAR/PC) obtained by mixing a plurality of resin materials including PAR, or a liquid crystal polymer. Base 12 is a substantially rectangular member in plan view, and includes a circular opening (not illustrated) in its center.

Base 12 includes, on its side surface, motor fixing parts (reference numerals omitted) in which driving parts 40A and 40B are disposed. Each motor fixing part has a shape capable of holding driving part 40A or 40B. In addition, base 12 includes base-side ball holding part (reference numerals omitted) each at a position facing a corresponding holder-side ball holding part of lens holder 11 in the radial direction. A biasing member (not illustrated) for biasing lens holder 11 is disposed in one of the base-side ball holding parts (for example, a ball holding part formed at one of the four corners located at the vertices of a rectangle).

Support parts 30A to 30C support lens holder 11 with lens holder 11 apart from base 12 in the radial direction. Each of support parts 30A to 30C is composed of a plurality of (for example, two) balls. Each ball is held between a base-side ball holding part of base 12 and a holder-side ball holding part of lens holder 11 with multi-point contact.

The number of support parts disposed in the circumferential direction and the number of balls constituting each support part are not limited and can be changed as appropriate.

Driving parts 40A and 40B are ultrasonic motor actuators that drive lens holder 11 relative to base 12 in the Z-axis direction. Driving parts 40A and 40B are disposed on the motor fixing part of base 12, which is the active member, and are coupled with lens holder 11, which is the passive member, via power transmission parts 112A and 112B.

Driving parts 40A and 40B are disposed, for example, at point-symmetrical positions with respect to the optical axis. In the present embodiment, driving parts 40A and 40B are disposed at two corners, which are diagonally positioned (namely corners each in the vicinity of support part 30B or 30C), among the three corners excluding the corner where support part 30A is disposed. By disposing the driving parts in this manner, lens holder 11 can be stably driven even in the case where the weight of the optical element such as lens part 2 (see FIG. 2) is increased.

Driving parts 40A and 40B each include resonance member 41 and piezoelectric elements 42.

Piezoelectric element 42 is, for example, a plate-shaped element formed from a ceramic material, and generates vibration when a high-frequency voltage is applied. Two piezoelectric elements 42 are disposed so as to hold the body portion (reference numeral omitted) of resonance member 41 therebetween.

The resonance member 41 is formed from a conductive material, and resonates upon receiving the vibration of piezoelectric elements 42. Resonance member 41 may be any metal having predetermined conductivity, shear strength, hardness, specific gravity, Young's modulus, and the like. For example, stainless steel is suitably used. Resonance member 41 is formed by, for example, laser processing, etching, pressing, or the like of a metal plate.

Resonance member 41 and piezoelectric elements 42 are electrically connected to electrodes (not illustrated) functioning as power supply lines. The electrodes are electrically connected to wiring (not illustrated) provided on circuit board part 50.

Resonance member 41 includes, for example, a substantially rectangular body portion (reference numeral omitted) held between piezoelectric elements 42, and two arms (reference numerals omitted) extending from the body portion in the Z-axis direction. The two arms form a substantially symmetrical shape, and free ends of the two arms contact power transmission part 112A or 112B. The two arms thus resonate with the vibration of piezoelectric elements 42, and deform symmetrically.

In the present embodiment, the free ends of the two arms hold power transmission part 112A or 112B therebetween in a biased state. Resonating of resonance member 41 while power transmission part 112A or 112B is in contact with resonance member 41 causes conversion of the vibration motion of piezoelectric elements 42 into the linear motion of power transmission part 112A or 112B. That is, resonance member 41 is an active element that generates a driving force in the linear direction, and power transmission parts 112A and 112B are passive elements that receive the driving force and move.

Resonance member 41 has at least two resonance frequencies, and deforms in different behavior for each resonance frequency. In other words, the overall shape of resonance member 41 is set in such a way that the resonance member deforms in different types of behavior for the two resonance frequencies.

The different types of behavior are as follows: the behavior of moving power transmission parts 112A and 112B toward the light receiving side in the optical axis direction (moving forward) and the behavior of moving power transmission parts 112A and 112B toward the image forming side in the optical axis direction (moving backward). That is, by vibrating resonance members 41 at a predetermined resonance frequency, power transmission parts 112A and 112B can be moved forward or backward in the Z-axis direction.

In optical element driving device 1, when a voltage is applied to driving parts 40A and 40B, piezoelectric elements 42 vibrate, and resonance members 41 deform in the behavior according to the frequency. Power transmission parts 112A and 112B are slid in the Z-axis direction by the driving force of driving parts 40A and 40B. Accordingly, lens holder 11 moves in the Z-axis direction, thereby performing focusing.

Circuit board part 50 includes flexible printed circuit board 51 (hereinafter referred to as "FPC 51" (FPC: flexible printed circuit)), driver IC 52, position detection sensor 53, temperature sensor 54, and the like. In the present embodiment, circuit board part 50 is disposed along the side surface of base 12 substantially in the entire circumference.

FPC 51 is a circuit board on which driver IC 52, position detection sensor 53, and temperature sensor 54 are mounted. FPC 51 is formed, for example, by laminating a thin insulating layer such as a resin film and a metal layer such as copper foil. Circuit wiring such as signal lines and power supply lines are formed from the metal layer.

The circuit wiring of FPC 51 is electrically connected to driving parts 40A and 40B, driver IC 52, position detection sensor 53, temperature sensor 54, and the like. In addition, when optical element driving device 1 is incorporated in camera module A, the circuit wiring of FPC 51 is electrically connected to the wiring of image sensor board 301.

Figure 4:
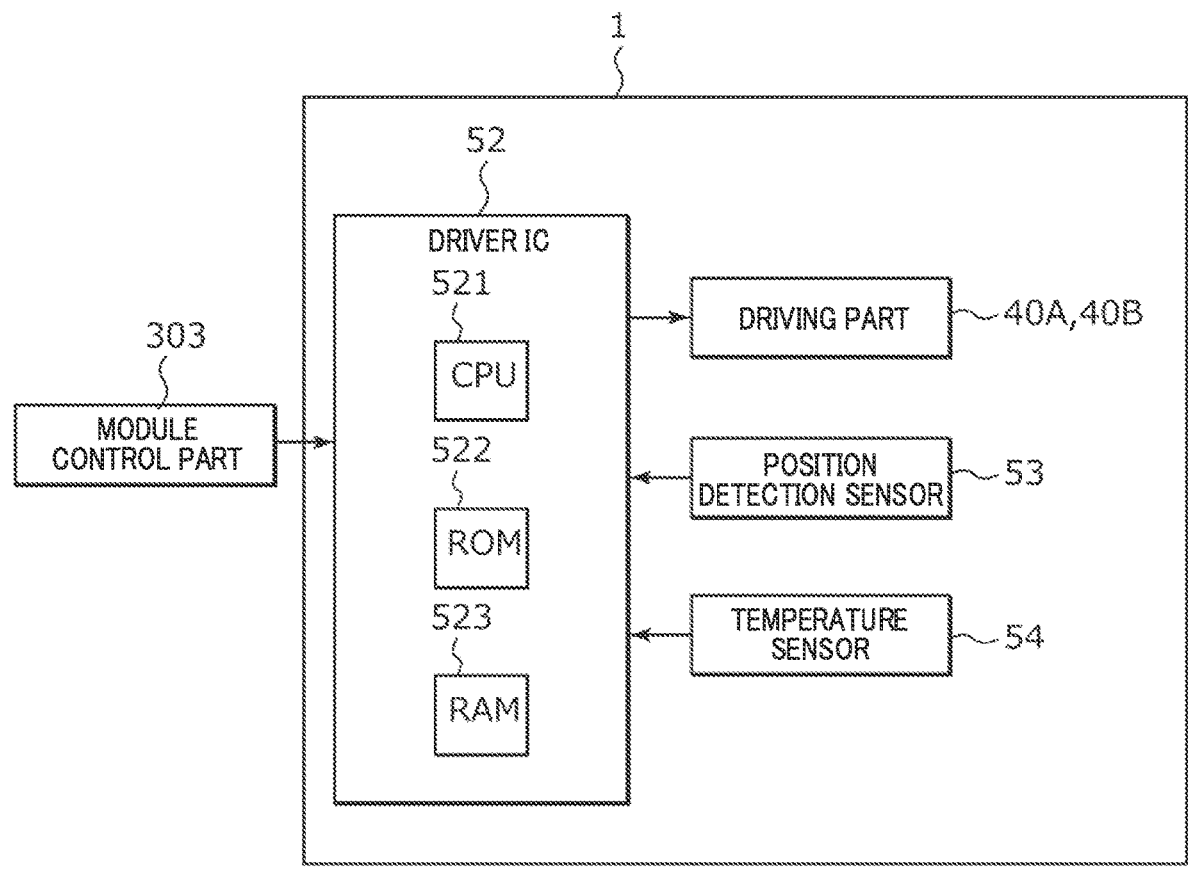
FIG. 4 is a block diagram illustrating an AF function in the optical element driving device.

Driver IC 52 is a hardware processor for controlling driving of driving parts 40A and 40B. Driver IC 52 includes, for example, central processing unit (CPU) 521 as an arithmetic/control device, read only memory (ROM) 522 and random access memory (RAM) 523 as main storage devices (see FIG. 4).

ROM 522 stores basic programs and basic setting data. ROM 522 also stores programs for performing drive control processing. CPU 521 reads a program corresponding to the processing content from ROM 522, loads the program in RAM 523, and executes the loaded program to control the operation of driving parts 40A and 40B.

Furthermore, in the present embodiment, ROM 522 stores initial values (see FIG. 6A) of a frequency table showing the relationship between the drive frequency of driving parts 40A and 40B and the ambient temperature. The frequency table is configured in such a way that the content of the ambient temperature can be written or rewritten.

Driver IC 52 outputs drive signals (electrical signals) including a predetermined drive frequency to driving parts 40A and 40B, for example, according to instructions from module control part 303 (drive control processing). In this drive control processing, driver IC 52 appropriately corrects the drive frequency based on the detection results from position detection sensor 53 and temperature sensor 54.

Position detection sensor 53 is, for example, a magnetic sensor such as a Hall element or tunnel magneto resistance (TMR) sensor. Position detection sensor 53 detects the strength of the magnetic force generated by a position detection magnet (not illustrated) disposed on lens holder 11, thereby acquiring the positions of lens holder 11 and base 12 relative to each other in the Z-axis direction and outputting the data to driver IC 52 as a detected position signal. Position detection sensor 53 and the position detection magnet are disposed, for example, so as to face each other in the radial direction.

Alternatively, the position of lens holder 11 in the Z-axis direction may be detected by an optical sensor such as a photoreflector.

Temperature sensor 54 is, for example, a thermistor. Temperature sensor 54 acquires the ambient temperature of optical element driving device 1 and outputs the data to driver IC 52 as a measured temperature signal. The measured temperature signal is stored, for example, in ROM 522 as needed.

Temperature sensor 54 is preferably disposed at a position close to driving part 40A and/or 40B. Such a configuration allows obtainment of the ambient temperature with higher accuracy as driving parts 40A and 40B serve as heat sources.

When automatic focusing (autofocus) is performed in optical element driving device 1, drive control of driving parts 40A and 40B is performed by driver IC 52 (drive control part). The drive control processing in optical element driving device 1 will be specifically described below with reference to FIG. 5.

Figure 5:
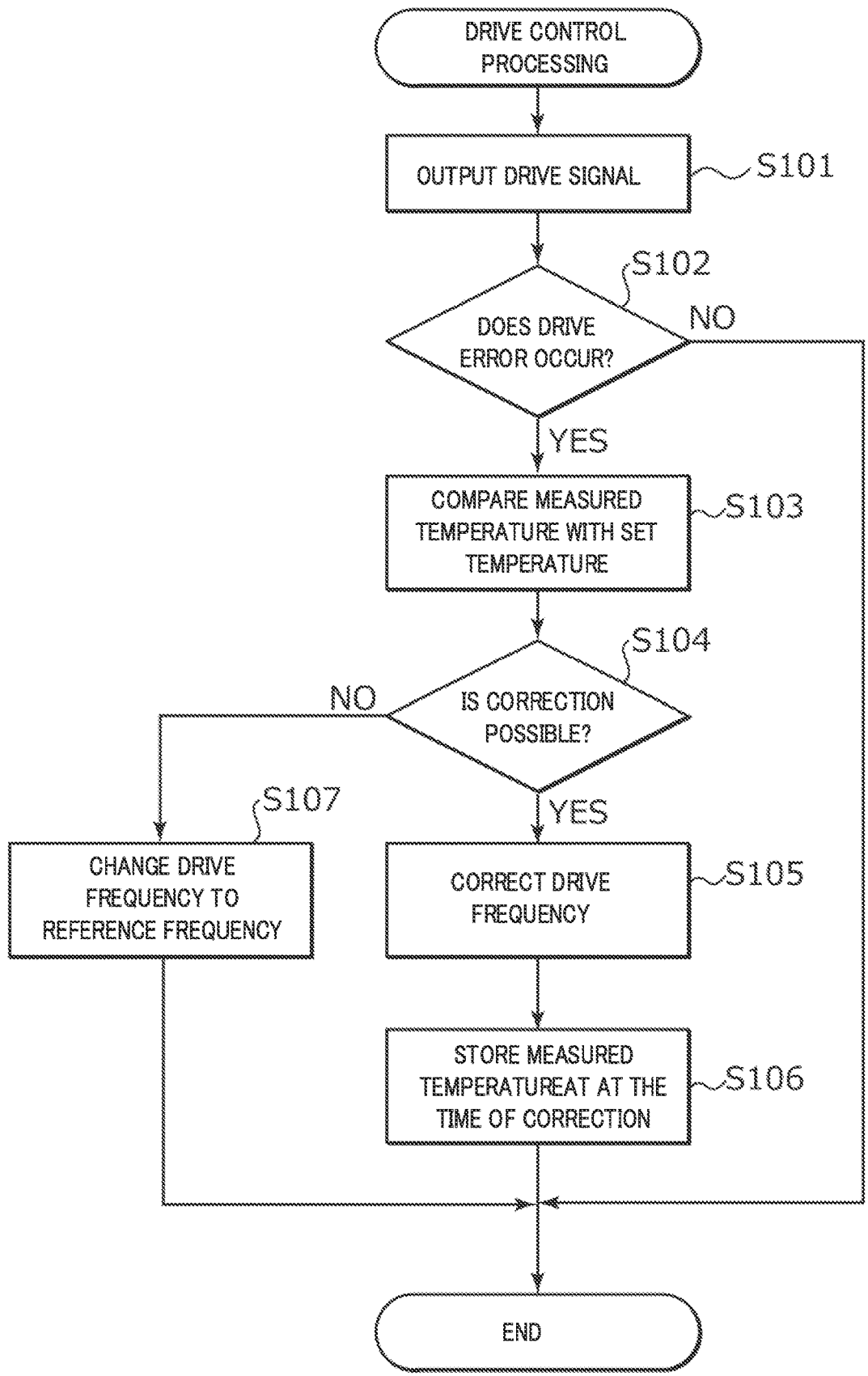
FIG. 5 is a flowchart illustrating an example of drive control processing in the optical element driving device.

FIG. 5 is a flowchart illustrating an example of drive control processing in optical element driving device 1. The flowchart illustrated in FIG. 5 is executed by driver IC 52 when a control signal (including an AF stroke) instructing autofocus driving is input from module control part 303 by, for example, a shooting operation (for example, pressing the shutter button) on the smartphone M.

It is configured that the detection results from position detection sensor 53 and temperature sensor 54 are always output to driver IC 52. Further, the drive control processing is executed for each drive mode of driving parts 40A and 40B, for example. Specifically, the following two types of drive control processing are performed according to separate frequency tables: drive control processing of deforming resonance member 41 for moving lens holder 11 toward the light receiving side in the optical axis direction; and drive control processing of deforming resonance member 41 for moving lens holder 11 toward the image forming side in the optical axis direction.

It is assumed that ROM 522 stores the frequency table illustrated in FIG. 6A as the default of the frequency table. The frequency table illustrated in FIG. 6 stores the following frequencies as the drive frequencies that can be set in the drive control processing: a reference frequency f0 and four correction frequencies f0±fc and f0±2fc that are stepwise increased or decreased by a predetermined shift width fc (for example, 20 kHz) from the reference frequency f0. Herein, it is assumed that a suitable drive frequency increases as the ambient temperature increases.

The upper limit value ("f0+2fc" in FIG. 6A) and the lower limit value ("f0−2fc" in FIG. 6A) of the drive frequency are set in a range such that the desired driving operation (moving forward or backward of lens holder 11) can be properly performed by driving parts 40A and 40B. In addition, the number of steps to change the drive frequency from the reference frequency f0 (two steps up and down in FIG. 6A) is not limited. The drive frequency may be changed in three or more steps (reducing the shift width fc).

In the frequency table illustrated in FIG. 6A, the reference frequency f0 and the reference temperature T0 are associated and stored as initial values. The reference temperature T0 with respect to the reference frequency f0 is preset for each product, for example, when optical element driving device 1 is manufactured. Immediately after the start of the drive control processing, the reference frequency f0 is set as the drive frequency.

In step S101 of FIG. 5, driver IC 52 outputs a drive signal to driving parts 40A and 40B in such a way that lens holder 11 is moved by the distance of the AF stroke instructed by the control signal from module control part 303, as autofocus processing. For example, immediately after the start of the drive control processing, a drive signal with the reference frequency f0 is output to driving parts 40A and 40B. As a result, lens holder 11 moves in the Z-axis direction, thereby performing focusing.

In step S102, driver IC 52 determines whether or not a drive error occurs based on the detection result from position detection sensor 53. When a drive error occurs ("YES" in step S102), the processing proceeds to step S103. When no drive error occurs ("NO" in step S102), the drive control processing is ended. In step S101 in the next drive control processing, the current drive frequency is maintained.

Specifically, driver IC 52 determines whether or not a drive error occurs based on the following: whether or not lens holder 11 is moved by the distance of a instructed AF stroke and converged to the target position, for example, within a predetermined time (for example, 30 ms). A drive error is determined to occur when lens holder 11 does not converge to the target position within a predetermined time.

In step S103, driver IC 52 compares the current ambient temperature measured by temperature sensor 54 (hereinafter referred to as "measured temperature") with the ambient temperature associated with the current drive frequency (hereinafter referred to as "set temperature"). For example, immediately after the start of the drive control processing, the reference temperature T0 associated with the reference frequency f0 becomes the set temperature.

In step S104, driver IC 52 determines whether or not the drive frequency can be corrected according to the comparison result (temperature difference between the measured temperature and the set temperature). When the drive frequency can be corrected ("YES" in step S104), the processing proceeds to step S105. When the drive frequency cannot be corrected ("NO" in step S104), the processing proceeds to step S107.

Specifically, driver IC determines that correction is possible when there is a correction frequency that can be set as the drive frequency in a frequency table (see, for example, FIG. 6A) and that correction is impossible when there is no correction frequency that can be set as the drive frequency in the table. For example, when a drive error occurs in drive control based on the upper limit value of the correction frequency (for example, the correction frequency f0+2fc in FIG. 6A) and the drive frequency should be further increased, there is no correction frequency that can be set as the drive frequency. Correction is impossible in such a case.

In step S105, driver IC 52 corrects the drive frequency according to the comparison result (temperature difference) in step S104. Until a drive error occurs again in step S102 of the drive control processing from the next time onward, drive control is performed by the drive signal including the corrected drive frequency.

In step S106, driver IC 52 stores the measured temperature at the time of the correction in the RAM 523 in association with the correction frequency. When a drive error occurs in the drive control processing from the next time onward, the stored measured temperature (correction temperature) becomes the "set temperature," and steps S103 and S104 are performed.

When it is determined in step S104 that correction is impossible, driver IC 52 sets the drive frequency back to the reference frequency f0 in step S107. In the drive control processing from the next time onward, drive control is performed by the drive signal with the reference frequency f0.

According to the flowchart illustrated in FIG. 5, the following processing is performed. After the start of the drive control processing, for example, during performing of the drive control based on the reference frequency f0, when a drive error occurs and the measured temperature is higher than the reference temperature T0, the drive frequency is corrected to the correction frequency f0+fc. In addition, the measured temperature at the time of the correction is stored in the frequency table as the correction temperature T1 (see FIG. 6B). In the subsequent drive control processing, the correction frequency f0+fc is used as the drive frequency (step S101). Further, when a drive error occurs in the subsequent drive control processing, the correction temperature T1 is used as the set temperature and compared with the current measured temperature (step S103).

After the start of the drive control processing, for example, during performing of the drive control based on the reference frequency f0, when a drive error occurs and the measured temperature is lower than the reference temperature T0, the drive frequency is corrected to the correction frequency f0−fc. In addition, the measured temperature at the time of the correction is stored in the frequency table as the correction temperature T3 (see FIG. 6C). In the subsequent drive control processing, the correction frequency f0−fc is used as the drive frequency (step S101). Further, when a drive error occurs in the subsequent drive control processing, the correction temperature T3 is used as the set temperature and compared with the current measured temperature (step S103).

For example, during performing of the drive control based on the correction frequency f0+fc, when a drive error occurs and the measured temperature is higher than the correction temperature T1 associated with the correction frequency f0+fc, the drive frequency is corrected to the correction frequency f0+2fc. In addition, the measured temperature at the time of the correction is stored in the frequency table as the correction temperature T2 (see FIG. 6D). In the subsequent drive control processing, the correction frequency f0+2fc is used as the drive frequency (step S101). Further, when a drive error occurs in the subsequent drive control processing, the correction temperature T2 is used as the set temperature and compared with the current measured temperature (step S103).

For example, during performing of the drive control based on the correction frequency f0+2fc, when a drive error occurs and the measured temperature is lower than the correction temperature T2 associated with the correction frequency f0+2fc, the drive frequency is corrected to the correction frequency f0+fc. In addition, the measured temperature at the time of the correction is used for overwriting, as the correction temperature T1 in the frequency table (see FIG. 6E). In the subsequent drive control processing, the correction frequency f0+fc is used as the drive frequency (step S101). Further, when a drive error occurs in the subsequent drive control processing, the correction temperature T1 after overwriting is used as the set temperature and compared with the current measured temperature (step S103).

For example, during performing of the drive control based on the correction frequency f0+2fc, when a drive error occurs and the measured temperature is higher than the correction temperature T2 associated with the correction frequency f0+2fc, correction becomes impossible, and the drive frequency is changed to the reference frequency f0 (step S107). In the subsequent drive control processing, the drive frequency is not corrected regardless of whether there is a drive error. That is, in the subsequent drive control processing, the drive frequency is maintained at the reference frequency f0, and a drive signal with the reference frequency f0 is output to driving parts 40A and 40B.

For example, during performing of the drive control based on the correction frequency f0+fc, when a drive error occurs and the measured temperature is lower than the correction temperature T1 associated with the correction frequency f0+fc, the drive frequency is corrected to the reference frequency f0. In this case, the measured temperature at the time of the correction is not stored in the frequency table, and the reference temperature T0 is maintained. In other words, the relationship between the reference frequency f0 and the reference temperature T0 is an optimum relationship obtained experimentally during manufacturing; thus no overwriting is preferably performed. This configuration can stabilize subsequent drive control processing.

As described above, optical element driving device 1, camera module A, smartphone M (camera-mounted device), and the driving method according to the present embodiment have the following characteristics independently or in combination as appropriate.

Optical element driving device 1 includes the following: base 12 (fixed body); lens holder 11 (movable body) that hold lens part 2 (optical element) and is disposed so as to be movable with respect to base 12; driving parts 40A and 40B each including piezoelectric element 42 and converting vibration motion of piezoelectric element 42 into linear motion for driving lens holder 11; driver IC 52 (drive control part) that applies a drive signal including a predetermined drive frequency to driving parts 40A and 40B; position detection sensor 53 (drive detection part) that detects the drive state of driving parts 40A and 40B; and temperature sensor 54 (temperature measurement part) that measures the ambient temperature of driving parts 40A and 40B. Driver IC 52 (drive control part) is capable of storing a plurality of drive frequencies and a plurality of ambient temperatures respectively in association with each other. Driver IC 52 determines whether or not a drive error of driving parts 40A and 40B occurs from the information detected by position detection sensor 53. When the drive error occurs, driver IC 52 compares an ambient temperature associated with the current drive frequency to the current ambient temperature measured by temperature sensor 54, corrects the drive frequency according to the comparison result, and stores the corrected drive frequency and the current ambient temperature in association with each other.

A driving method of optical element driving device 1 is a method for driving optical element driving device 1 that includes base 12 (fixed body), lens holder 11 (movable body) disposed so as to be movable with respect to base 12, and driving parts 40A and 40B each including piezoelectric element 42 and converting vibration motion of piezoelectric element 42 into linear motion for driving lens holder 11. The driving method includes the following steps: applying a drive signal including a predetermined drive frequency to driving parts 40A and 40B (step S101 in FIG. 5); detecting the drive state of driving parts 40A and 40B; measuring the ambient temperature of driving parts 40A and 40B; determining whether or not a drive error of driving parts 40A and 40B occurs from the detected drive state (step S102 in FIG. 5); when the drive error occurs, comparing the set temperature (ambient temperature associated with the current drive frequency) with the measured temperature (measured current ambient temperature) when the drive error occurs (step S103 in FIG. 5); correcting the drive frequency according to the comparison result (steps S104 and S105 in FIG. 5); and storing the corrected drive frequency and the current ambient temperature in association with each other (step S106 in FIG. 5).

According to optical element driving device 1 and the driving method, while each product is driven, the content of the frequency table indicating the relationship between the drive frequency and the ambient temperature are updated, and drive control is performed based on the updated relationship. Therefore, the drive frequency of the drive signal to be applied to piezoelectric element 42 can be appropriately corrected according to the ambient temperature in consideration of the temperature dependence of piezoelectric element 42, thereby performing desired drive control.

In optical element driving device 1, the plurality of drive frequencies include a reference frequency f0 associated with a reference temperature T0 in advance, correction frequencies f0+fc and f0+2fc (first correction frequencies) set higher than the reference frequency f0, and correction frequencies f0−fc and f0−2fc (second correction frequencies) set lower than the reference frequency f0. Driver IC (drive control part) compares the reference temperature T0 with the measured temperature (current ambient temperature), and selects one of the first correction frequencies and the second correction frequencies according to the comparison result. As a result, the drive frequency of the drive signal to be applied to piezoelectric element 42 can be appropriately corrected according to the comparison result between the measured temperature and the reference temperature.

In optical element driving device 1, the plurality of correction frequencies f0+fc and f0+2fc (first correction frequencies) are set stepwise, and correction frequencies f0−fc and f0−2fc (second correction frequencies) are set stepwise. As a result, the processing load for setting the correction frequencies in the drive control processing can be reduced, thereby increasing the speed of the drive control processing.

In optical element driving device 1, when the drive frequency cannot be corrected, driver IC 52 (drive control part) sets the drive frequency back to the reference frequency f0 and maintains the reference frequency f0. As a result, problems, such as the drive frequency deviating from a proper range and lens holder 11 not being driven, can be prevented from occurring.

In optical element driving device 1, driving parts 40A and 40B each have a plurality of drive modes respectively having drive directions different to each other, and driver IC 52 (drive control part) controls the drive frequency for each of the plurality of drive modes. As a result, for driving parts 40A and 40B each having a plurality of resonance frequencies and deforming in different behavior for each resonance frequency (behavior of moving lens holder 11 toward the image forming side in the optical axis direction and behavior of moving lens holder 11 toward the light receiving side in the optical axis direction), each behavior can be controlled appropriately.

The present invention made by the present inventor has been specifically described based on the embodiment; however, the present invention is not limited to the above embodiment, and can be modified without departing from the scope of the invention.

In the above embodiment, for example, smartphone M is described as an example; however, the present invention is also applicable to a camera-mounted device including a camera module and an image processing part that processes image information obtained by the camera module. Examples of such a camera-mounted device include information devices and transporting devices. Examples of the information devices include camera-equipped mobile phones, laptop computers, tablet terminals, mobile game machines, web cameras, and in-vehicle devices with cameras (for example, rear-view monitor devices and drive recorder devices). Examples of the transporting devices include automobiles and drones (unmanned aircrafts).

Figure 7A:
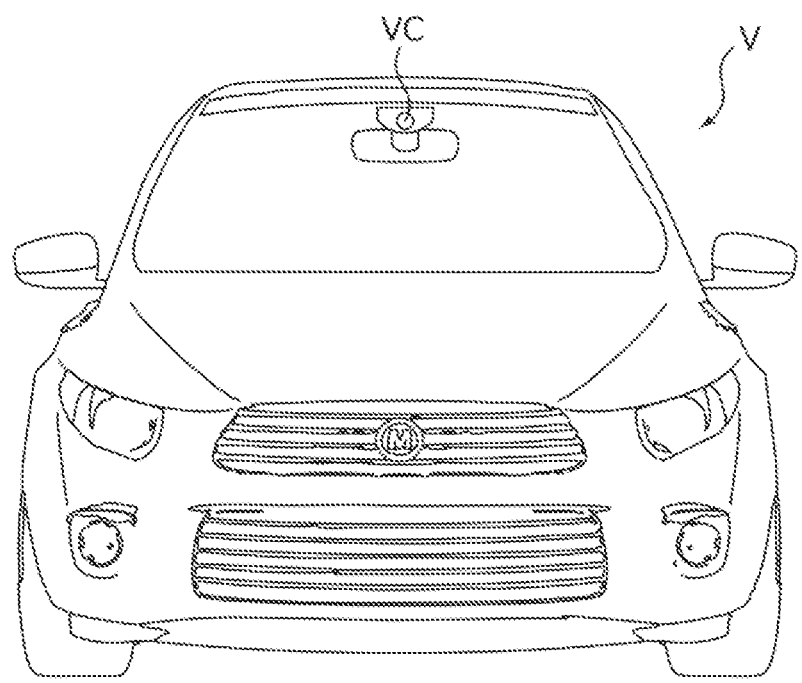
FIGS. 7A and 7B illustrate an automobile as a camera-mounted device equipped with an in-vehicle camera module.
Figure 7B:
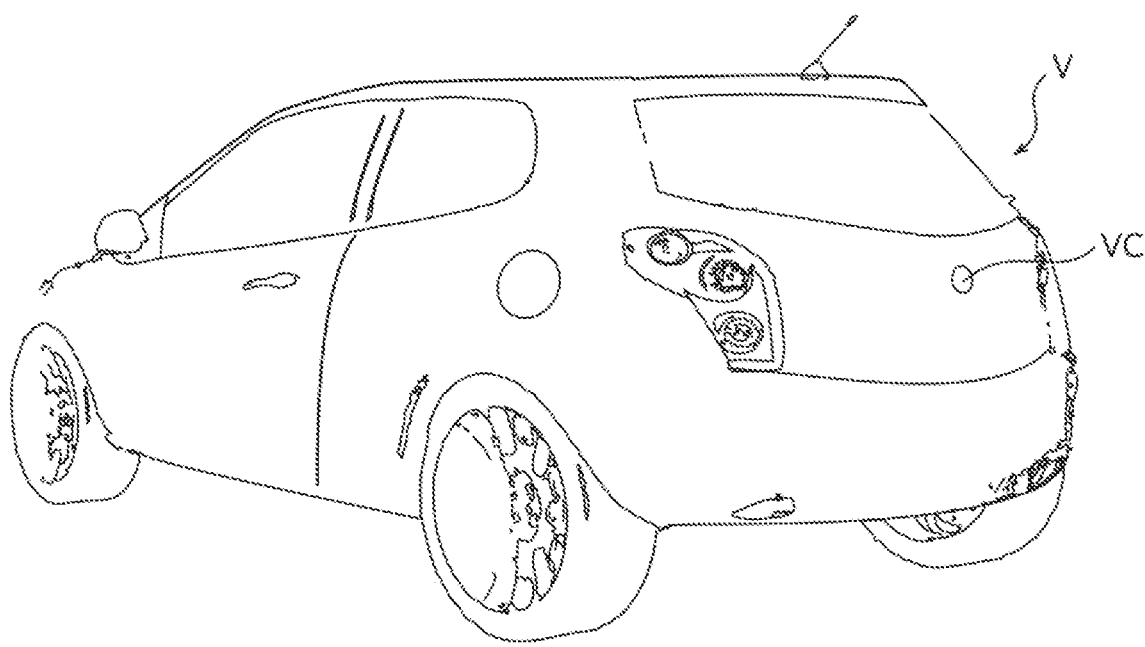

FIGS. 7A and 7B illustrate automobile V serving as the camera-mounted device equipped with in-vehicle camera module VC (i.e., vehicle camera). FIG. 7A is a front view of automobile V, and FIG. 7B is a rear perspective view of automobile V. Automobile V is equipped with camera module A described in the above embodiment as in-vehicle camera module VC. As illustrated in FIGS. 7A and 7B, in-vehicle camera module VC is attached, for example, to a windshield to face forward or to a rear gate to face backward. In-vehicle camera module VC is used for rear-view monitoring, drive recording, collision avoidance control, automatic drive control, and the like.

The above embodiment describes, as an optical element, optical element driving device 1 driving lens part 2; however, the optical element to be driven may be an optical element other than a lens, such as a mirror or a prism. In addition, the present invention can be applied to, for example, an optical element driving device configured to drive an imaging element as an optical element.

Optical element driving device 1 has an AF function in the above embodiment; however, an optical element driving device having a function of moving lens part 2 in the Z direction, such as a zoom function, in addition to the AF function may be used. The above embodiment describes optical element driving device 1 having an AF function as an example; however, the present invention can be applied to an optical element driving device having at least one of AF function and OIS function.

It should be considered that the embodiments disclosed herein are illustrative in all respects and not restrictive. The scope of the present invention is indicated by the claims rather than the above description, and is intended to include all modifications within the scope and equivalent meaning of the claims.

What is claimed is:

1. An optical element driving device, comprising:
   a fixed body;
   a movable body that holds an optical element and is disposed so as to be movable with respect to the fixed body;
   a driving part that includes a piezoelectric element and converts vibration motion of the piezoelectric element into linear motion for driving the movable body;
   a drive control part that applies a drive signal including a predetermined drive frequency to the driving part;
   a drive detection part that detects a drive state of the driving part; and
   a temperature measurement part that measures an ambient temperature of the driving part,
   wherein
   the drive control part is configured to store a plurality of drive frequencies and a plurality of ambient temperatures respectively in association with each other,
   the drive control part determines whether or not a drive error of the driving part occurs from information detected by the drive detection part,
   when the drive error occurs, the drive control part performs comparison between an ambient temperature associated with a current drive frequency and a current ambient temperature measured by the temperature measurement part, the ambient temperature being one of the plurality of ambient temperatures, and
   the drive control part corrects the current drive frequency according to a result of the comparison, and stores the current drive frequency corrected and the current ambient temperature in association with each other.

2. The optical element driving device according to claim 1, wherein:
   the plurality of drive frequencies include a reference frequency associated with a reference temperature in advance, a first correction frequency set higher than the reference frequency, and a second correction frequency set lower than the reference frequency, and
   the drive control part performs comparison between the reference temperature and the current ambient temperature, and selects one of the first correction frequency and the second correction frequency according to a result of the comparison.

3. The optical element driving device according to claim 2, wherein
   a plurality of the first correction frequencies are set stepwise, and a plurality of the second correction frequencies are set stepwise.

4. The optical element driving device according to claim 2, wherein
   when the current drive frequency is not correctable, the drive control part set the current drive frequency back to the reference frequency and maintains the reference frequency.

5. The optical element driving device according to claim 1, wherein:
   the driving part has a plurality of drive modes respectively having drive directions different to each other, and
   the drive control part controls the predetermined drive frequency for each of the plurality of drive modes.

6. The optical element driving device according to claim 1, wherein
   the drive detection part is a magnetic sensor.

7. The optical element driving device according to claim 1, wherein
   the temperature measurement part is a thermistor.

8. A camera module, comprising:
   the optical element driving device according to claim 1; and
   an imaging part that captures a subject image by using the optical element.

9. A camera-mounted device that is an information device or a transporting device, the camera-mounted device comprising:
   the camera module according to claim 8.

10. A method for driving an optical element driving device that includes a fixed body, a movable body disposed so as to be movable with respect to the fixed body, and a driving part including a piezoelectric element and converting vibration motion of the piezoelectric element into linear motion for driving the movable body, the method comprising:
    applying a drive signal including a predetermined drive frequency to the driving part;
    detecting a drive state of the driving part;
    measuring a current ambient temperature of the driving part;
    determining whether or not a drive error of the driving part occurs from the drive state detected;
    when the drive error occurs, performing comparison between an ambient temperature associated with a current drive frequency and the current ambient temperature measured, and
    correcting the current drive frequency according to a result of the comparison; and
    storing the current drive frequency corrected and the current ambient temperature in association with each other.

* * * * *